United States Patent [19]
Youn

[11] Patent Number: 5,847,924
[45] Date of Patent: Dec. 8, 1998

[54] NOTEBOOK COMPUTER ASSEMBLY HAVING AN ATTACHABLE COMPACT EXTENSION MODULE FOR CONNECTING PERIPHERAL EQUIPMENT TO A NOTEBOOK COMPUTER

[75] Inventor: Jae-Sam Youn, Suwon, Rep. of Korea

[73] Assignee: SamSung Electronics Co., Ltd., Suwon, Rep. of Korea

[21] Appl. No.: 764,071

[22] Filed: Dec. 6, 1996

[30] Foreign Application Priority Data

Dec. 8, 1995 [KR] Rep. of Korea ............... 47938/1995

[51] Int. Cl.⁶ .................. G06F 1/16; H01R 13/62
[52] U.S. Cl. .......................... 361/686; 439/366
[58] Field of Search .............. 364/708.1; 361/686; 439/366, 372, 357, 330, 374, 376, 929

[56] References Cited

U.S. PATENT DOCUMENTS

| | | | |
|---|---|---|---|
| D. 375,086 | 10/1996 | Kondo . | |
| 4,969,830 | 11/1990 | Daly et al. | 361/686 X |
| 5,126,954 | 6/1992 | Morita . | |
| 5,186,646 | 2/1993 | Pederson | 439/374 |
| 5,247,285 | 9/1993 | Yokota et al. . | |
| 5,375,076 | 12/1994 | Goodrich et al. | 364/708.1 |
| 5,381,043 | 1/1995 | Kohitama et al. . | |
| 5,400,055 | 3/1995 | Ma et al. | 345/168 |
| 5,459,637 | 10/1995 | Ma et al. . | |
| 5,460,547 | 10/1995 | Belt et al. . | |
| 5,572,399 | 11/1996 | Shirato et al. . | |

FOREIGN PATENT DOCUMENTS

| | | |
|---|---|---|
| 4-195507 | 7/1992 | Japan . |
| 5-66852(A) | 3/1993 | Japan . |
| 5-100772(A) | 4/1993 | Japan . |
| 5-100773(A) | 4/1993 | Japan . |
| 6-83484(A) | 3/1994 | Japan . |
| 6-119081(A) | 4/1994 | Japan . |

*Primary Examiner*—Michael W. Phillips
*Attorney, Agent, or Firm*—Robert E. Bushnell, Esq.

[57] ABSTRACT

A portable notebook computer assembly having a notebook computer which attaches to an extension module. Both the notebook computer and the extension module are compact, lightweight, and portable. The extension module contains peripheral features that enable the notebook computer to gain access to the peripheral features. A more secure mechanical juncture is formed between the notebook computer and the extension module to allow for a better electrical connection. Three, instead of four contact points are formed between the notebook computer and the extension module. Two of the three junctures are the two buckles while the third is a guide holder, consisting of a continuum of points along one edge of the device opposite from the buckles. With this improved design, the notebook computer can attach better mechanically and electrically to the extension module.

15 Claims, 2 Drawing Sheets

NOTEBOOK COMPUTER ASSEMBLY HAVING AN ATTACHABLE COMPACT EXTENSION MODULE FOR CONNECTING PERIPHERAL EQUIPMENT TO A NOTEBOOK COMPUTER

This application makes reference to, incorporates the same herein, and claims all benefits accruing under 35 U.S.C. §119 arising from an application for Notebook Computer Housing Assembly Capable of Extending Functions earlier filed in the Korean Industrial Property Office on 8 Dec. 1995 and there duly assigned Ser. No. 47938/1995.

FIELD OF THE INVENTION

The present invention pertains to a compact, portable, and lightweight expansion module that both physically and electronically attaches peripheral units to a host notebook or laptop computer.

BACKGROUND OF THE INVENTION

The notion of attaching an expansion unit to a notebook or laptop computer to enable the laptop or notebook computer to have access to peripheral devices is not new. There are numerous references that contain such portable designs for expansion modules. For example, U.S. Pat. No. 5,459,637 for a Portable Notebook Computer Expansion Adaptor to Ma discloses a portable notebook computer with an expansion adaptor. Ma has an electrical connector socket positioned on the bottom side of a base portion of the notebook computer that connects with an electrical connector on the top side of the expansion module. Ma, et al. '637 does not contain the U shape holder guide nor does it contain buckles. Instead, a strap is used to hold the base portion of a notebook computer onto the expansion module.

A second example is shown in U.S. Pat. No. 4,969,830 for a Connection Between Portable Computer Components to Daly, et al. whereby a hand held portable computer that is secured to a peripheral or a expansion module in a snap arrangement. A multiple contact bus connector positioned on the bottom portion of the notebook computer mates with the top portion of an expansion module. A latch member of the expansion module is hooked onto an opening in the notebook computer, fastening the notebook computer to the expansion module. Daly, et al. '830 uses the expansion module to connect peripheral devices such as more memory, disk storage, or additional battery power to the notebook computer.

Japanese patent 404195507 to Ideno discloses an expansion module for a notebook computer containing a hooking mechanism for physically binding the expansion module to the notebook computer. The hooking mechanism is positioned about a pivot on the expansion module and pivotally rotates to hook or catch a latch part on the base portion of the notebook computer.

The notion of having the peripheral devices built into the notebook computer itself is also not new. By having a compact dick random access memory (CD-ROM) drives or a microprocessors built into the base portion of the body of a notebook computer, the need for an expansion module in some circumstances has been avoided. For example, U.S. Pat. No. 5,572,399 for an Information Processing Apparatus Having CD-ROM Device to Shirato et al. discloses a notebook computer having a CD-ROM disk drive built within. The CD-ROM disk drive is accessed by lifting up the keyboard of the notebook computer. No expansion or extension boards are used to accommodate this peripheral device.

In addition, Shirato et al. '399 accommodates a second drive unit in addition to the CD-ROM disk drive device. Thus, the prior art demonstrates that it is unnecessary to require an expansion board or an extension card to have a notebook computer connected to a CD-ROM disk drive. In addition to Shirato et al. '399, U.S. Des. Pat. No. 375,086 for an Electronic Computer to Kondo shows, in FIG. 11, an ornamental design for a laptop computer with a CD-ROM disk drive built within.

What is needed is a better mechanical juncture between the notebook computer and the expansion module containing the peripheral devices. A better mechanical or physical juncture will result in a better electrical juncture between the notebook computer and the expansion unit. This better mechanical juncture is made up of three, instead of four points of contact between the notebook computer and the expansion unit. In addition to the two buckles, the present invention contains a holder guide which serves as the third and last point of contact between the two units. Because the holder guide is a continuum of points, there is no pivoting, and the notebook computer is more securely fastened to the expansion board than as shown in the prior art.

SUMMARY OF THE INVENTION

It is therefore an object to provide an expansion module design for a notebook computer.

It is also object to provide a notebook computer and expansion unit combination containing a more secure mechanical and electrical connection between the two units than disclosed in the prior art.

According to the present invention, a portable notebook computer housing assembly capable of extending functions comprises a slim type notebook computer having a housing consisting of an upper part and a lower part with its bottom having a first set of data signal connectors, and a functional extension case having a front side provided with fastening means and a rear side with a holder guide to mount the slim type notebook computer. The functional extension case is equipped with a second set of data signal connectors on the top side. The slim type note book computer is fixedly mounted on the functional extension case with the first set of data signal connectors connected to the second set of data signal connectors, with the two buckles fastened on both sides of the front portion of the notebook computer, and a holder guide in the rear of the functional extension case which holds the entire rear edge of the notebook computer into place.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
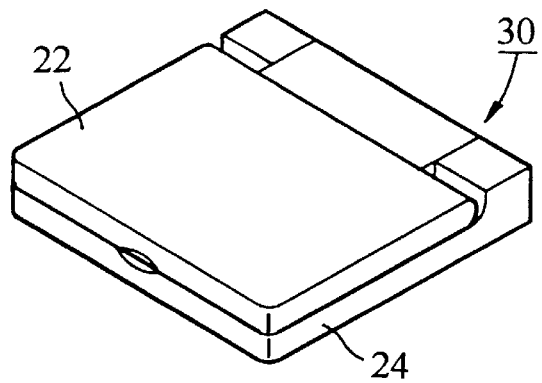
FIG. 1 is a perspective view for illustrating a slim type portable notebook computer.
Figures 2A, 2B:
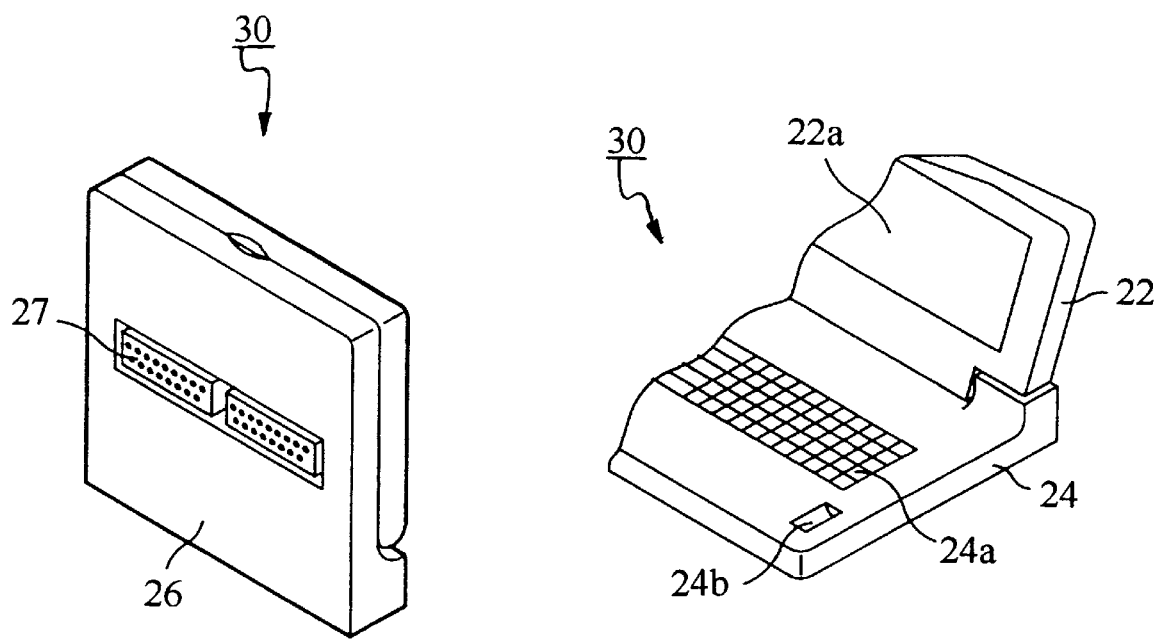
FIG. 2A is a perspective view for illustrating the bottom of a portable notebook computer according to the present invention.
FIG. 2B is a perspective view for illustrating the portable notebook computer of FIG. 2A opened to show the lower keyboard part according to the present invention.

Referring to FIGS. 1–2B, the housing of a portable notebook computer 30 consists of cover 22 having display panel 22a and base portion 24 having keyboard 24a. Bottom side 26 of base portion 24 is provided with first set of data signal connectors 27 for connecting with external devices, as shown in FIGS. 2A and 2B. Also provided on the upper surface of base portion 24 are a pair of fixing holes 24b symmetrically positioned near both the left and the right side of the base portion 24.

Figure 3:
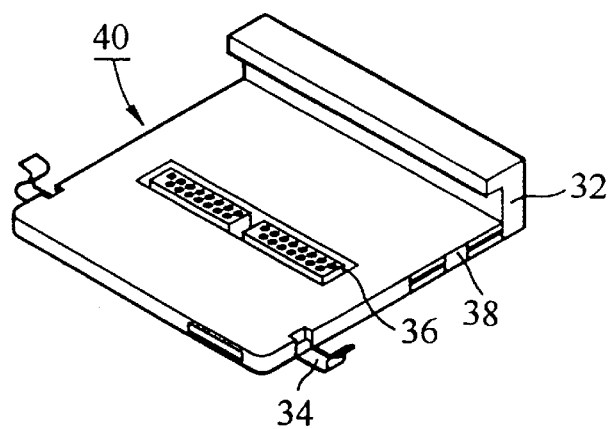
FIG. 3 is a perspective view for illustrating a functional extension case for the notebook computer of FIGS. 2A and 2B according to the present invention.
Figure 4:
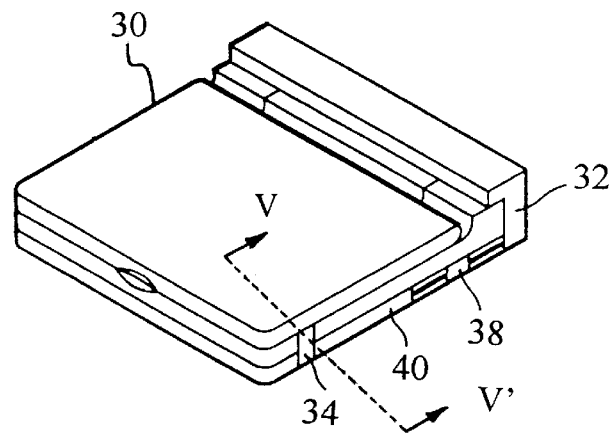
FIG. 4 is a perspective view for illustrating the notebook computer mounted on the functional extension case according to the present invention.

A functional extension case 40, as shown in FIG. 3, is provided to have a front side equipped with buckles 34 and a rear side with a U-shaped holder guide 32 to mount notebook computer 30 as shown in FIG. 4. Buckles 34 are designed to be held by latching recesses 24b of the upper surface of base portion 24 of notebook computer 30. Functional extension case 40 is also equipped with second set of data signal connectors 36 to be connected with the first set of data signal connectors 27 on the bottom of base portion 24 of notebook computer 30. Functional extension case 40 is also provided with a bay 38 for mounting an auxiliary device such as compact disk read only memory (CD-ROM) disk drives. Functional extension case 40 also contains a microprocessor unit for use by notebook computer 30.

Buckles 34 consist of a pair of resilient strips 33 perpendicularly bent. Each of the resilient strips 33 has one end shaped in a curved grip 34a to be held by a latching recesses 24b, and the other end shaped as a pivot loop 34b rotatable about hinge 40a mounted on functional extension case 40.

Figure 5:
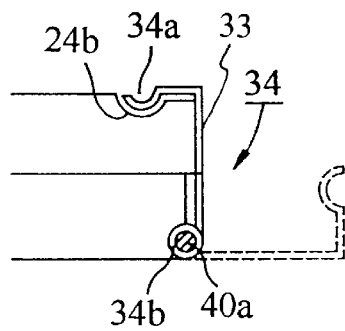
FIG. 5 is a cross sectional view of an engaged buckle shown in FIG. 4 taken in the direction of V—V.

As shown in FIGS. 4 and 5, notebook computer 30 is mounted on functional extension case 40 with the rear end being inserted into U-shaped holder guide 32. First set of data signal connectors 27 provided in the bottom of base portion 24 of notebook computer 30 are connected with second set of data signal connectors 36 provided on the top side of functional extension case 40. Curved grips 34a of resilient strips 33 are pivoted to be held by latching recesses 24b of base portion 24 of notebook computer housing 30. Separation of notebook computer 30 from functional extension case 40 is accomplished by detaching the resilient strips 33 of buckles 34 from latching recesses 24b and by separating first and the second set of data signal connectors 27 and 36 respectively from each other.

While there have been illustrated and described what are considered to be preferred embodiments of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A notebook computer assembly having an attachable compact extension module for connecting peripheral equipment to a notebook computer, said assembly comprising:

said notebook computer having a cover portion containing a display unit, and a base portion, said base portion having a top side, a bottom side, a front end, and a rear end, said top side formed by a pair of fixing recesses, said cover portion being pivotally attached to said rear end of said base portion, said top side of said base portion having a keyboard and said bottom side of said base portion having a first set of data signal connectors;

said extension module having a top side, a bottom side, a front side, a rear side, a left side, and a right side, said extension module having a second set of data signal connectors located on said top side that matingly engage said first set of data signal connectors on said notebook computer, electrically connecting said extension module to said notebook computer; and a pair of buckles, each one of said pair of buckles having a distal and a proximal end, one of said pair of buckles being located on said left side of said extension module and another of said pair of buckles being located on said right side of said extension module, said pair of buckles operatively engaging said pair of fixing recesses located on said front end of said top side of said base portion of said notebook computer, attaching said extension module to said notebook computer.

2. The notebook computer assembly of claim 1, said extension module contains at least one compact disk drive read only memory (CD-ROM drive).

3. The notebook computer assembly of claim 2, said extension module contains at least one microprocessor unit for use by said notebook computer.

4. The notebook computer assembly of claim 3, said rear side of said extension module being comprised of a U-shaped holder guide for accommodating said rear end of said base portion of said notebook computer when said notebook computer is attached to said extension module.

5. The notebook computer assembly of claim 4, further comprising:

a pair of hinges located at said front side of said bottom side of said extension module, said proximal ends of each one of said pair of buckles being pivotally attached about respective ones of said pair of hinges.

6. The notebook computer of claim 5, said distal ends of each of said pair of buckles operatively engaging with said pair of fixing recesses on said top side of said notebook computer, attaching said extension module to said notebook computer.

7. The notebook computer of claim 6, said distal end of each of said pair of buckles each contain a curved grip for engagement to each of said pair of fixing recesses in said notebook computer.

8. A notebook computer assembly having an attachable compact extension module for connecting peripheral equipment to a notebook computer, said assembly comprising:

said notebook computer having a cover portion containing a display unit, and a base portion, said base portion having a top side, a bottom side, a front end, and a rear end, said top side formed by a pair of fixing recesses, said cover portion being pivotally attached to said rear end of said base portion, said top side of said base portion having a keyboard and said bottom side of said base portion having a first set of data signal connectors;

said extension module having a top side, a bottom side, a front side, a rear side, a left side, and a right side, said extension module having a second set of data signal connectors on said top side that matingly engage said first set of data signal connectors on said notebook computer, electrically connecting said extension module to said notebook computer; and said rear side of said extension module being comprised of a U-shaped holder guide for accommodating said rear end of said base portion of said notebook computer when said notebook computer is physically attached to said extension module.

9. The notebook computer assembly of claim 8, said extension module contains at least one compact disk read only memory (CD ROM) disk drive.

10. The notebook computer assembly of claim 9, said extension module contains at least one microprocessor unit for use by said notebook computer.

11. The notebook computer assembly of claim 10, further comprising:

a pair of buckles, each having a distal end and a proximal end; and a pair of hinges, one of said pair of hinges being located on said left side of said extension module and another of said pair of hinges being located on said right side of said extension module, said proximal ends of each one of said pair of buckles being pivotally attached about respective ones of said pair of hinges.

12. A portable notebook computer housing assembly capable of performing peripheral functions, comprising:

a compact notebook computer having a housing consisting of a cover portion and a base portion, said base portion having a bottom and a top side, said base portion having a first set of data signal connectors on said bottom side; and a functional extension case having a front side, rear side, top side, a bottom side, a right side, and a left side, said right side and said left side each provided with one of a pair of fastening means for fastening said functional extension case to said compact notebook computer, said rear side of said top side having a U-shaped holder guide to mount said compact notebook computer for extending the functions of said compact notebook computer, said functional extension case being equipped with second set of data signal connectors on said top side, said compact note book computer is fixedly mounted on said functional extension case with said first set of data signal connectors mated to said second set of data signal connectors.

13. The notebook computer housing assembly as defined in claim 12, said fastening means comprising a pair of buckles.

14. The notebook computer housing assembly as defined in claim 13, each of said buckles has a distal end and a proximal end, said distal end shaped as a curved grip, said proximal end shaped as a pivot loop rotatable about a hinge.

15. The portable notebook computer housing assembly as defined in claim 14, said top side of said base portion of said compact notebook computer being formed by a pair of latching recesses to hold said curved grips.

\* \* \* \* \*